J. BORYSZEWSKI.
TIRE AND FASTENING MEANS THEREFOR.
APPLICATION FILED MAR. 12, 1918.

1,274,237.

Patented July 30, 1918.
2 SHEETS—SHEET 1.

WITNESSES

INVENTOR
Joseph Boryszewski
BY
ATTORNEYS

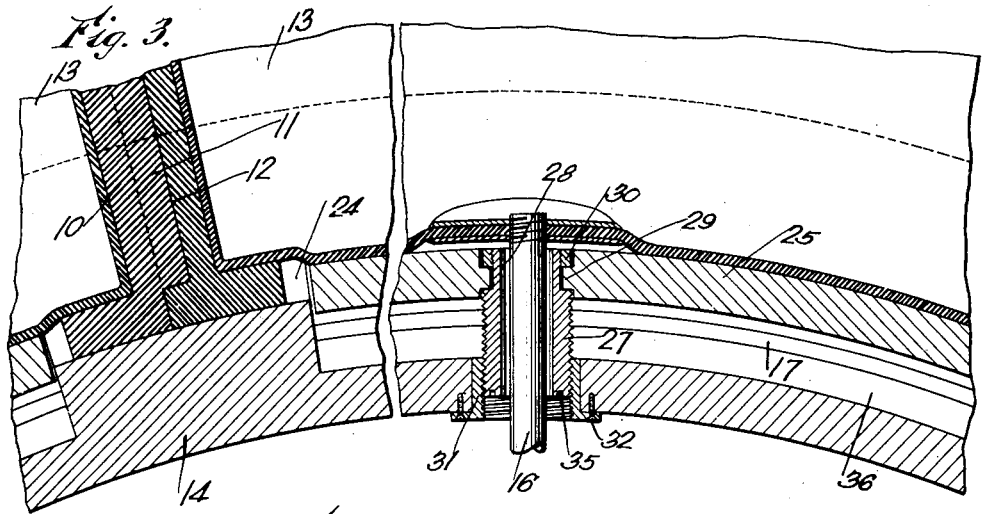

UNITED STATES PATENT OFFICE.

JOSEPH BORYSZEWSKI, OF FORKS, NEW YORK.

TIRE AND FASTENING MEANS THEREFOR.

1,274,237. Specification of Letters Patent. Patented July 30, 1918.

Application filed March 12, 1918. Serial No. 221,910.

*To all whom it may concern:*

Be it known that I, JOSEPH BORYSZEWSKI, a citizen of the United States, and a resident of Forks, in the county of Erie and State of New York, have invented a new and Improved Tire and Fastening Means Therefor, of which the following is a description.

My invention relates to pneumatic vehicle tires and more particularly to vehicle tires made up of separate segmental sections each having a pneumatic inner tube and an air valve therefor.

Objects of my invention are to provide the segmental tire sections with fastening means adapted to engage mating fastening members on annular tire clamping elements secured to the wheel rim; and to provide wedge means acting on the tire sections at the flaps to effect engagement of the fastening means thereon with the relatively fixed mating fastening members.

Reference is to be had to the accompanying drawings forming a part of this specification, it being understood that the drawings are merely illustrative of one example of the invention.

Fig. 3 is a longitudinal section on the line 3—3, Fig. 2;

Fig. 4 is a view of the inner side of the tire section on a scale reduced from that of Figs. 2 and 3;

Fig. 5 is a face view of a wedge employed in fastening the tire sections, on the scale of Fig. 4;

Fig. 6 is a perspective view of a wrench employed in fastening and unfastening the tire sections.

Figure 1:
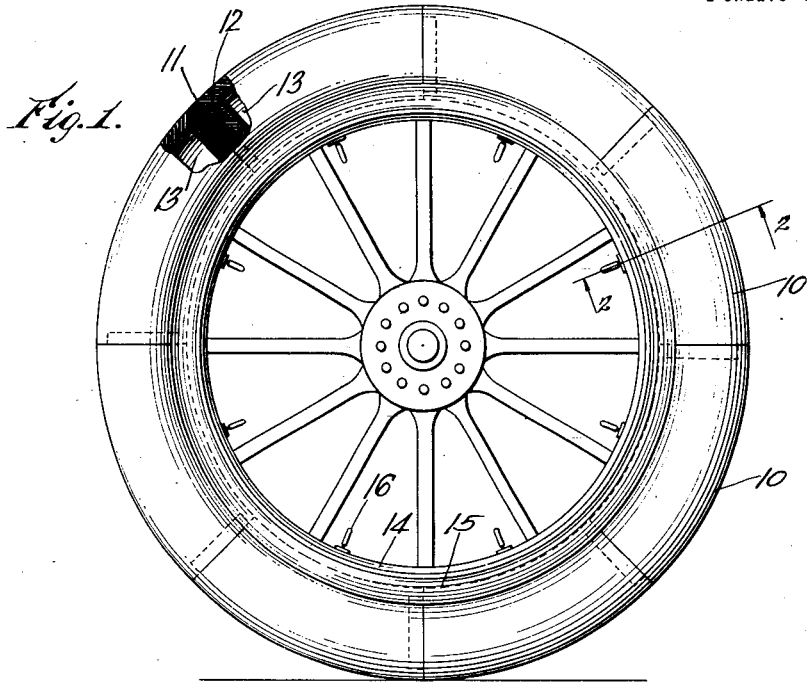
Figure 1 is a partly sectional side elevation of a vehicle wheel equipped with my improved tire and fastening means.

The numeral 10 indicates separate segmental tire sections having closed ends, the opposite ends of each section being formed respectively with a tenon 11 and a mating mortise 12 to effect interengagement of the abutting ends of the sections. An inner tube 13 is provided for each tire section, said tube having closed ends and each inner tube having its individual air valve 16. On the wheel rim 14 at each side is secured in any suitable manner a ring or annular tire fastening element 15.

To each tire section at the inner or rim side are secured fastener plates 17, one plate at each side of the center, said plates having laterally projecting fastener members 19, 20 adjacent to the outer and inner edges thereof and on the outside of the plates, adapted to be received in annular recesses 21 and 22 in the inner faces of the rings 15. The recesses 21 are undercut at the outer sides and the fasteners 19 correspond with the said undercut ends of said recesses to have in effect semi-dovetail engagement therewith. The fastener elements 20 are disposed parallel with the outer surface of the rim 14, or approximately so, the recess 22 being made to correspond. Each tire section 10 is slotted lengthwise as at 23 at the rim side and the plates 17 are disposed at the opposite sides of said slot. In addition to the lengthwise slots 23, transverse slots or cuts 24 are formed in the tire section at the ends of the slot 23, so that the portions of the tire section 10 carrying the fastener plates 17 are in the form of flaps.

Figure 2:
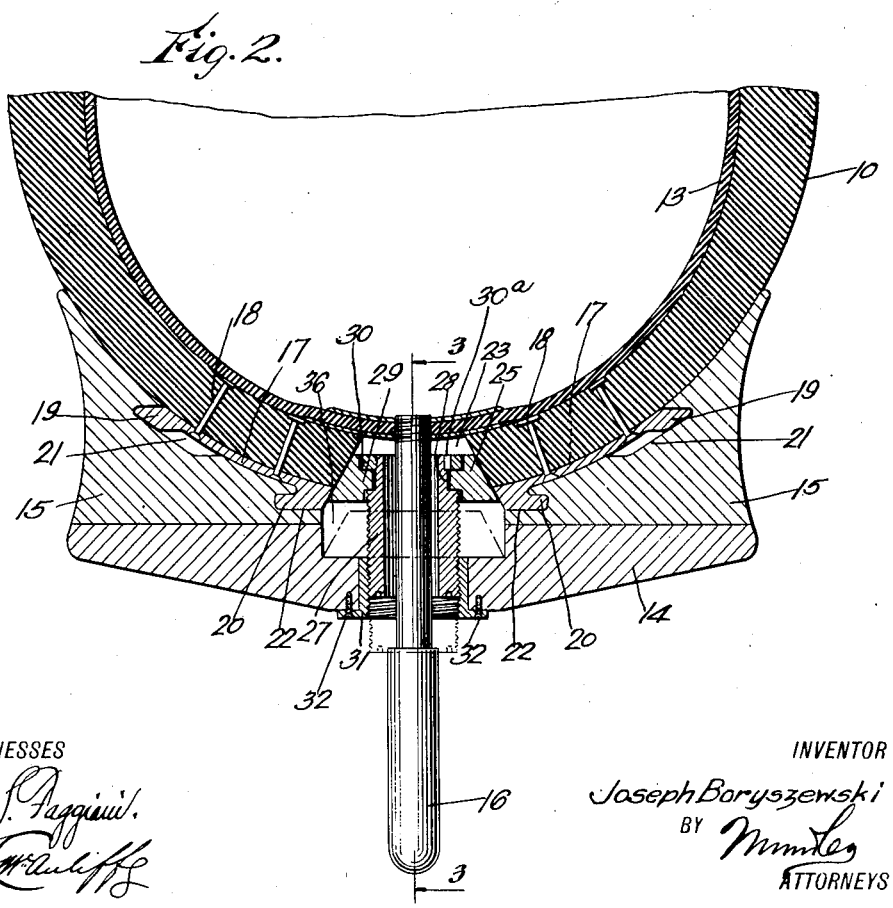
Fig. 2 is a fragmentary cross sectional view on an enlarged scale, the section being taken through the tire and wheel rim in a plane corresponding with the line 2—2, Fig. 1.

I employ a longitudinally curved wedge 25 in the slot 23 of each tire section to expand the tire section and thereby engage the fastener elements 19, 20, with the ring 15, said wedge having a radial hole 26 therein for the passage of the air valve 16 and for accommodating also a nut 27 which is swiveled to said wedge. Said nut is of reduced diameter and unthreaded near its outer end as at 28 to thereby produce a shoulder on the nut and the wedge has an annular rib or bead 29 at the hole 26 accommodating said reduced portion of the nut and adapted to bear against the shoulder of the latter. The connection of the wedge and nut 27 is completed by a clamp nut or threaded washer 30, which is applied to the end of the nut 30 to clamp said rib or bead 29 against the shoulder of the nut 27, a fastener key 30ª (Fig. 2) being provided for said clamp nut 30. The nut 27 is externally threaded to engage threads in an internally threaded bushing 31 in the rim 14 and suitably secured to the latter as by screws 32. By turning the nut 27 in the bushing 31, said nut may be moved radially inward or radially outward to actuate the wedge 25 in the fastening or unfastening of a tire section. To turn the nut 27 a wrench 33 such as illustrated in Fig. 6 may be employed having wrench studs 34 adapted to engage in recesses 35 in the nut.

The wedges 25 in their radial movements are accommodated in segmental recesses 36 in the wheel rim 14.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A tire having slots forming flaps at opposite sides of the median line thereof, at the inner periphery, said slots including transverse slots and slots at right angles to and connecting the transverse slots, the free edges of said flaps being disposed toward each other, fastener rings adapted to extend about the tire at each side, metallic fastener elements secured to said flaps, said rings and said fastener elements having mating fastener members, and wedge means disposed between said flaps and movable radially to permit engagement or disengagement of said fastener members.

2. A tire slotted at the rim side presenting flaps at opposite sides of the median line of the section, the free edges of the flaps being disposed toward each other, fastener elements on said flaps, rings adapted to extend about the tire at each side and adapted to be secured to a wheel rim, rigid fastener strips secured to said flaps, mating fastener members on said strips and on said rings, a wedge disposed between the flaps, a nut swiveled to the wedge of each section and extending radially inward, and a bushing in which the nut is adapted to move, said bushing having means to secure it to a wheel rim.

JOSEPH BORYSZEWSKI.